US009801243B2

(12) United States Patent
Sauerlander et al.

(10) Patent No.: US 9,801,243 B2
(45) Date of Patent: Oct. 24, 2017

(54) LIGHTING SYSTEM WITH A PLURALITY OF LEDS

(75) Inventors: Georg Sauerlander, Aachen (DE); Harald Willwohl, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1243 days.

(21) Appl. No.: 13/126,470

(22) PCT Filed: Nov. 9, 2009

(86) PCT No.: PCT/IB2009/054966
§ 371 (c)(1),
(2), (4) Date: Apr. 28, 2011

(87) PCT Pub. No.: WO2010/055456
PCT Pub. Date: May 20, 2010

(65) Prior Publication Data
US 2011/0210670 A1    Sep. 1, 2011

(30) Foreign Application Priority Data

Nov. 13, 2008  (EP) ..................... 08169022

(51) Int. Cl.
*H05B 37/02* (2006.01)
*H05B 33/08* (2006.01)
*H05B 37/03* (2006.01)

(52) U.S. Cl.
CPC ......... *H05B 33/083* (2013.01); *H05B 33/089* (2013.01); *H05B 37/0263* (2013.01); *H05B 37/036* (2013.01); *Y02B 20/48* (2013.01)

(58) Field of Classification Search
CPC ............ H05B 33/0827; H05B 33/0842; H05B 33/0815; H05B 33/0845; H05B 33/089;
(Continued)

(56) References Cited

U.S. PATENT DOCUMENTS 5,420,482 A * 5/1995 Phares .......................... 315/292
5,459,328 A * 10/1995 Kadota et al. ................ 250/551
(Continued)

FOREIGN PATENT DOCUMENTS

DE          10358447 B3     5/2005
DE       102006031679 A1    1/2008
(Continued)

*Primary Examiner* — Vibol Tan
(74) *Attorney, Agent, or Firm* — Akarsh P. Belagodu

(57) ABSTRACT

A lighting system (1) comprises a power unit (20) for producing data-modulated current, and a light unit (10) receiving this current at its input and output terminals (11, 12).

The light unit comprises two or more light modules (100A; 100B; 100C) connected in series.

Each light module comprises:
  a LED string (110) of one or more LEDs (111, 112, 113) connected between module input and output terminals (101, 102), each LED having an associated controllable shunt switch (121, 122, 123) connected in parallel thereto;
  a module controller (190) for controlling the shunt switches, the module controller (190) having a input terminals (191, 192) connected to said module input and output terminals, respectively. The module controller demodulates the data and controls the switches on the basis of an action command contained therein, if an address information contained therein matches the unique controller address.

8 Claims, 2 Drawing Sheets

(58) Field of Classification Search
CPC .. H05B 37/036; H05B 33/083; H05B 37/0263; Y02B 20/341; Y02B 20/347; Y02B 20/48
USPC ... 315/209 R, 210, 224, 246, 291, 307, 312, 315/360, 294, 297, 122, 123
See application file for complete search history.

(56) References Cited

U.S. PATENT DOCUMENTS

| | | | |
|---|---|---|---|
| 6,153,980 A | | 11/2000 | Marshall et al. |
| 7,994,723 B2* | | 8/2011 | Budde ............... H05B 37/0263 315/88 |
| 8,242,710 B2* | | 8/2012 | Radermacher et al. ...... 315/306 |
| 8,299,724 B2* | | 10/2012 | Huynh ................ H05B 33/083 315/291 |
| 8,441,213 B2* | | 5/2013 | Huynh ............... H05B 33/0845 315/209 R |
| 9,253,850 B2* | | 2/2016 | DeNicholas ......... H05B 33/089 |
| 2004/0245946 A1* | | 12/2004 | Halter ........................... 315/312 |
| 2005/0231134 A1* | | 10/2005 | Sid ............................... 315/294 |
| 2006/0028155 A1 | | 2/2006 | Young |
| 2006/0186820 A1* | | 8/2006 | Yang ............................ 315/158 |
| 2006/0279262 A1 | | 12/2006 | Chiang et al. |
| 2007/0085494 A1* | | 4/2007 | Takeda et al. ................ 315/316 |
| 2007/0103905 A1* | | 5/2007 | Kang et al. ................... 362/276 |
| 2008/0094000 A1* | | 4/2008 | Yamamoto et al. .......... 315/250 |
| 2008/0191642 A1* | | 8/2008 | Slot et al. ..................... 315/295 |
| 2008/0231203 A1* | | 9/2008 | Budde et al. ................. 315/186 |
| 2009/0021185 A1* | | 1/2009 | Ng ................................ 315/294 |
| 2011/0210674 A1* | | 9/2011 | Melanson ......... H05B 33/0815 315/185 R |

FOREIGN PATENT DOCUMENTS

| | | |
|---|---|---|
| EP | 1336943 A1 | 8/2003 |
| JP | 2004039366 A | 2/2004 |
| JP | 2005310997 A | 11/2005 |
| JP | 2005536849 A | 12/2005 |
| JP | 2006103404 A | 4/2006 |
| WO | 2008001274 A2 | 1/2008 |
| WO | 2008071235 A1 | 6/2008 |
| WO | 2008129504 A1 | 10/2008 |
| WO | 2009013675 A1 | 1/2009 |

* cited by examiner

LIGHTING SYSTEM WITH A PLURALITY OF LEDS

FIELD OF THE INVENTION

The present invention relates in general to a lighting system having at least one light unit comprising a plurality of LEDs.

BACKGROUND OF THE INVENTION

A light unit in a car conventionally consists of an incandescent lamp, more recently a HID lamp. With the development of high power LEDs, it has become possible to design such light unit, for instance a head light, a tail light, a brake light, as a multi LED source. The present invention relates particularly to the headlight unit of a vehicle, and the invention will hereinafter specifically be explained for this application, but it is noted that the gist of the present invention is more generally applicable to any multi LED source.

The vehicle will be provided with a central controller, which decides whether the headlight as a whole should be switched off or on. For generating the LED current, the vehicle is further provided with a driver device.

In principle, it is possible that all LEDs are controlled simultaneously, for instance by being connected in parallel and/or in series. However, it is desirable that each LED can be controlled individually, among other things in order to implement different lighting functionalities (high beam, low beam, corner beam), and in order to be able to detect failure of individual LEDs. This individual controllability can be implemented by having individual LED drivers associated with the individual LEDs, each LED driver being controlled by the central controller, but this would require a plurality of LED drivers, which is costly, as well as a plurality of wiring connections between the central controller and the individual LED drivers. Alternatively, in the more cost-efficient design of one common LED driver, the individual controllability can also be implemented but would require a driver having a plurality of outputs and, again, a plurality of wiring connections between the individual driver outputs and the individual LED drivers.

SUMMARY OF THE INVENTION

A general objective of the present invention is to provide a solution to the above-mentioned problems.

According to an important aspect of the present invention, the lighting system has a power unit comprising a common controller and a common driver. The light unit comprises at least two LEDs mounted in series. One common power line connects the series arrangement of LEDs with one driver output. The power line may actually consist of two wires for providing a return path for the current, but it is also possible that the return path for the current is provided by mass.

According to a further important aspect of the present invention, each LED is provided with a shunt switch and a voltage sensor for monitoring the LED voltage, while the light unit comprises at least one controller receiving the sensor signals and controlling the shunt switches.

According to a further important aspect of the present invention, the output current from the power unit is modulated with data, in such a way that the modulation does not interfere with the operation of the LEDs, i.e. does not lead to noticeable flicker to the human eye. Each controller is capable to detect the modulated data and to decode this data. The data will contain addresses of the controllers and commands for the respective controllers. Each controller will determine whether the received data is intended for it, and if yes, it will control the corresponding shunt switches on the basis of the corresponding data commands.

The LEDs may be arranged in multiple light modules, each light module comprising one LED or at least two LEDs mounted in series. Each light module is provided with a module controller for controlling the LED or LEDs of that particular module. The light modules are coupled such that all LEDs are connected in series.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
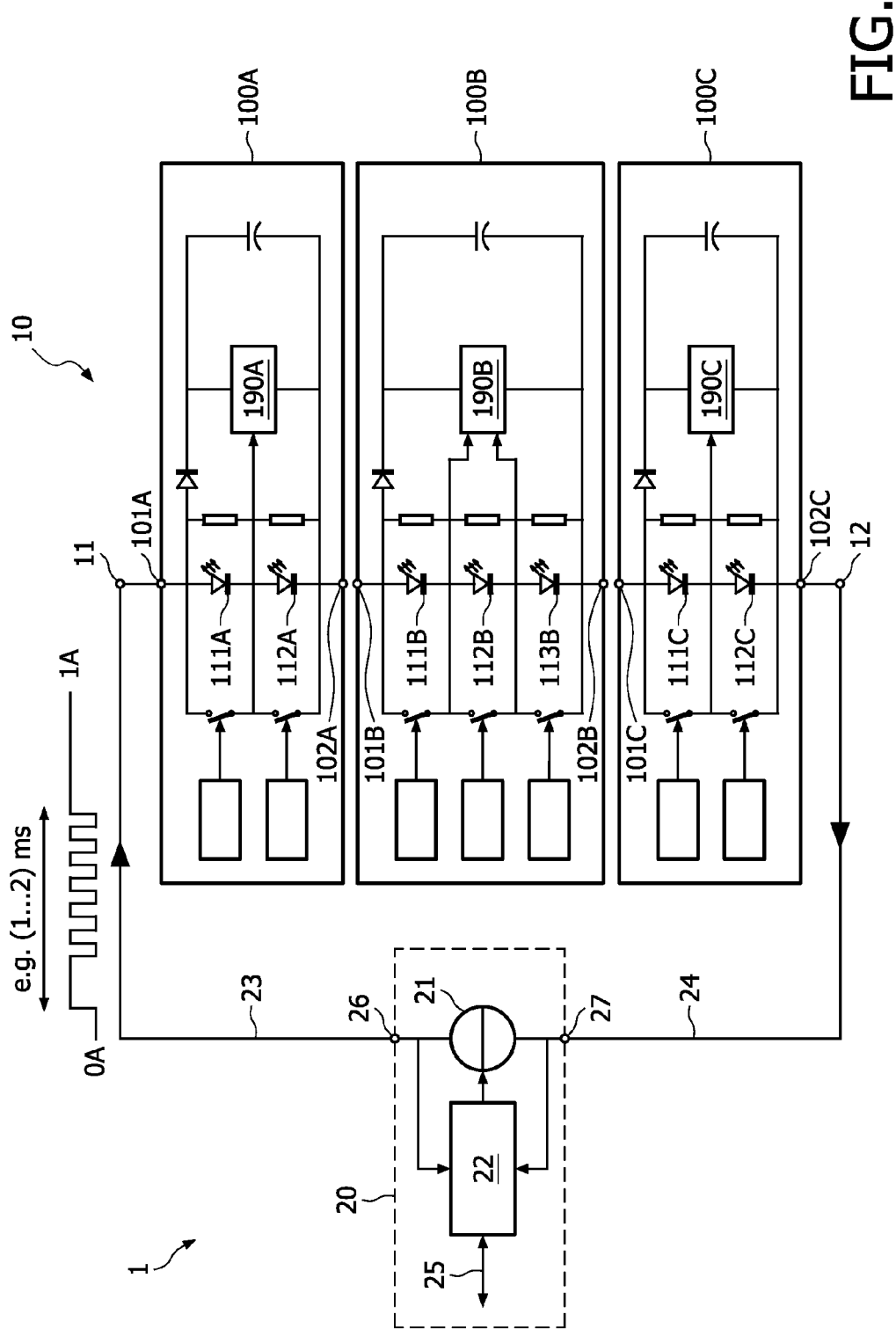
FIG. 1 schematically shows a lighting system according to the present invention.

FIG. 1 schematically shows a lighting system 1 according to the present invention. The lighting system 1 comprises a light unit 10 comprising a plurality of LEDs connected in series. The light unit 10 of the embodiment shown consists of a plurality of light modules. In the following, the modules in general are indicated with reference numeral 100, while individual modules are distinguished by the addition of a character A, B, C, etc; the same applies to components of the modules. In the embodiment shown, the system comprises three modules, but this is by way of non-limiting example only: there may be four or more modules, but it is also possible to have only one module.

Figure 2:
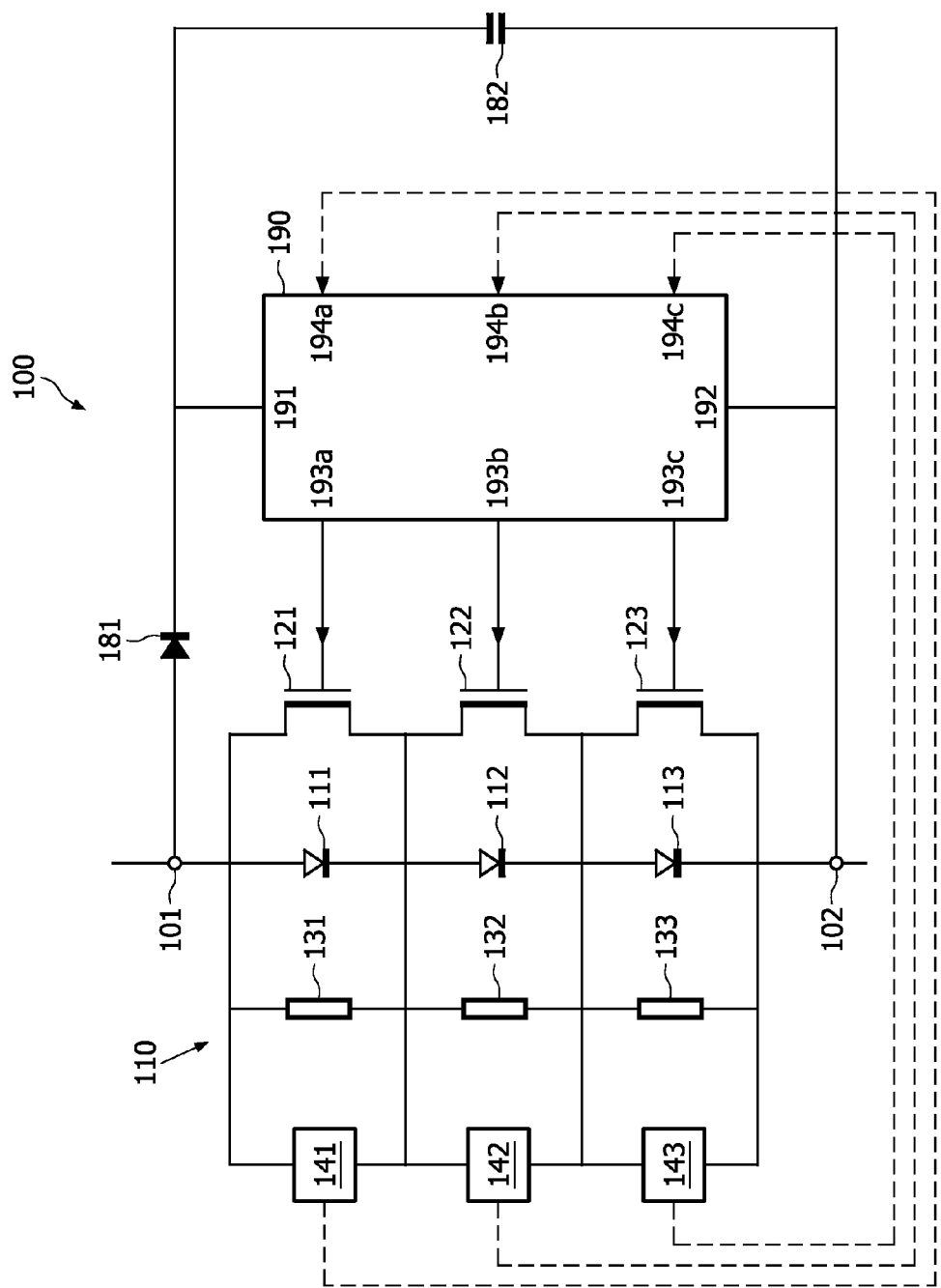
FIG. 2 schematically shows a block diagram of a light module.

FIG. 2 schematically shows a block diagram of a light module 100 on a larger scale. Details of the lighting system as a whole will be discussed with reference to FIG. 1, while internal details of the individual light modules will be discussed with reference to FIG. 2.

Each light module 100 has an input terminal 101 and an output terminal 102. Between these terminals, a LED string 110 is connected. The string 110 may consist of a series arrangement of a plurality of LEDs 111, 112, 113. The number of LEDs may be equal to two (as shown for modules 100A and 100C), or equal to three (as shown for module 100B), or even more (not shown). In an embodiment where the light unit 10 consists of only one module, the single module contains all LEDs of the light unit. In an embodiment where the light unit 10 consists of a plurality of modules, one or more modules may have a LED string 110 of only one single LED.

The light modules 100 are arranged in series, i.e. their respective LED strings 110 are arranged in series. Particularly, output terminal 102A of module 100A is connected to input terminal 101B of module 100B, and output terminal 102B of module 100B is connected to input terminal 101C of module 100C. Input terminal 101A of module 100A constitutes an input terminal 11 for the light unit 10, and output terminal 102C of module 100C constitutes an output terminal 12 for the light unit 10.

The lighting system 1 further comprises a common power unit 20, comprising a controllable current source 21 and a common power controller 22. The power unit has output terminals 26, 27 of the current source 21, connected to the light unit 10 via power lines 23, 24; it should be clear that one of these lines may be implemented by mass, i.e. a vehicle's chassis or frame.

Parallel to each LED 111, 112, 113 of each light module 100, a controllable shunt switch 121, 122, 123 is connected (see FIG. 2). The shunt switch has two states: it is either open (non-conductive) or closed (conductive). Thus, it should be clear that the current provided by the power unit 20 passes through all LEDs or their associated shunt switches, depending on the respective states of these switches.

For controlling the shunt switches, the light module 100 comprises a module controller 190. Control output terminals 193a, 193b, 193c are connected to control terminals of the shunt switches 121, 122, 123. By generating a suitable control signal, the controller 190 is capable of switching ON or OFF each individual LED, and is even capable of executing a duty cycle control to effect reduced light output operation per individual LED, as should be clear to a person skilled in the art. It is noted that a high power LED has an intrinsic capacitance; in order to quickly discharge this capacitance, a discharge resistor 131, 132, 133 is preferably connected in parallel to the respective LEDs 111, 112, 113, as shown.

It should be clear that the LED current does not depend on the switching state of individual shunt switches. However, if one LED fails, it may be that the current path is interrupted and that the entire light unit 10 cannot produce any output light. In order to prevent this, each LED 111, 112, 113 is preferably provided with a voltage sensor 141, 142, 143 measuring the voltage drop over the LED. The measuring signals of the voltage sensors 141, 142, 143 are received by the module controller 190 at respective sensor inputs 194a, 194b, 194c. If a measuring signal indicates that a certain LED has failed, the module controller 190 generates a suitable control signal for the associated shunt switch such that this shunt switch is maintained closed (conductive).

It is noted that the voltage sensors may be separate parts, as shown, but it is also possible that the voltage sensors are integrated in the module controller 190.

The module controller 190 has a first input terminal 191 connected to the module input terminal 101 and a second input terminal 192 connected to the module output terminal 102. A one-way conductive element 181, for instance comprising one or more diodes in series, assures polarity at said input terminals 191, 192. In view of the voltage drop developing over the LEDs 111, 112, 113, the module controller 190 receives a supply voltage.

Preferably, the module controller 190 is provided with an energy buffer 182, for instance a capacitor, parallel to its input terminals 191, 192.

If all switches 131, 132, 133 are closed, it may be that the voltage drop over the module input and output terminals 101, 102 is too low for being able to supply the module controller 190, particularly in view of the fact that the one-way conductive element 181 develops a voltage drop when conducting. This can be solved if the controller 190 is provided with a controllable switch bridging the one-way conductive element 181, so that the controller 190 can regularly short the element 181 briefly to obtain a charge current pulse. This is, however, not illustrated as it does not relate to the controlling of the LEDs.

According to an important aspect of the present invention, the operation of the module controllers is controlled by the power controller 22. The power controller 22 may have, as shown, an input 25 for receiving command signals from a master controller of the vehicle (not shown); such command may for instance be: HIGH LIGHT, LOW LIGHT, PARKING LIGHT, CORNER LIGHT, etc. This command determines whether a certain module should be switched OFF or ON, or should be switched at reduced light output. Alternatively, the command may be initiated by the power controller 22 itself. In any case, the command is communicated to the individual module controllers by the power controller 22. In order not to require individual command signal lines, command communication is executed by way of data modulation of the LED current.

While the LED current basically is a constant current, data modulation may be effected by a series of current interruptions (indicated as "pulses") of such frequency and duration as not to affect light output of the LEDs, at least not noticeable for the human eye. These interruptions may be effected by the power controller 22 briefly switching OFF the current source 21. Coding may be done in accordance with any suitable coding scheme, as should be clear to a person skilled in the art, thus a detailed explanation thereof will be omitted here. In any case, the pulses will convey the following data:

address of module controller;
action to be performed.

Since the number of possible actions is relatively small, while further the number of modules will be relatively small, the total number of bits to convey is relatively small.

It is noted that the power controller 22 does not need to produce the data coding continuously: a brief data burst having a duration of a few milliseconds or less will usually be sufficient. The module controller concerned will obey the command (for instance: HIGH LIGHT) until receiving a next command.

Since the current passes each light module 100, the data modulation thereof is received by each module controller 190 as a voltage modulation at its input terminals 191, 192. The module controller 190 is capable of signal processing this voltage modulation in order to decode the data, and to derive address and action contained in the decoded data. Each module controller 190 has a unique address (at least: unique within the light unit 10), and is capable to compare the decoded address data with its own address: if these match, the module controller 190 will execute the decoded action command, otherwise it will ignore this action command.

It is noted that a complication may arise if all switches 131, 132, 133 are closed, because in that case it may be that the voltage drop over the module input and output terminals 101, 102 is quite low and it is difficult for the module controller 190 to receive and process the data signals. This will depend on the saturation voltage of the switches 131, 132, 133, i.e. the voltage which develops over their terminals in the conductive state. This in turn may depend on the type of switch. In any case, this complication will be reduced when the number of LEDs in the LED string 110, corresponding to the number of switches connected in series between controller input and output terminals 191, 192, is increased.

It is noted that it is also possible that a module controller 190 sends data to the power controller 22. Data transmission will start with a request-to-send, in which the module controller sends its address, and in response the power controller 22 will enter a listening mode. Data transmission can be executed by a module controller briefly switching one (or more) of its associated shunt switches. If a switch is closed, a data pulse can be implemented by briefly opening the switch. If a switch is open, a data pulse can be implemented by briefly closing the switch. In both cases, there will be no influence on the LED current, but, in view of the fact that the voltage drop over a conducting LED (for instance about 3V) is larger than the voltage drop over a conducting switch, a voltage pulse over the current supply 21 will be caused. The power controller 22 will be provided with a voltage sensor (not shown for sake of simplicity) sensing the voltage over the current supply 21, so that the power controller 22 will receive a signal representing the data sent by the module controller 190.

Summarizing, the present invention provides a lighting system 1 comprising a power unit 20 for producing data-modulated current, and a light unit 10 receiving this current at its input and output terminals 11, 12.

The light unit comprises two or more light modules 100A; 100B; 100C connected in series.

Each light module comprises:
a LED string 110 of one or more LEDs 111, 112, 113 connected between module input and output terminals 101, 102, each LED having an associated controllable shunt switch 121, 122, 123 connected in parallel thereto;
a module controller 190 for controlling the shunt switches, the module controller 190 having a input terminals 191, 192 connected to said module input and output terminals, respectively. The module controller demodulates the data and controls the switches on the basis of an action command contained therein, if an address information contained therein matches the unique controller address.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, each module needs to have only one single controller for all LEDs of the module, but it is within the gist of the invention of a module has two or more controllers, each controller for controlling one or more of the LEDs of this module. The phrase "module controller" will also refer to such case.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A light module, comprising:
an input terminal;
an output terminal;
a LED string comprising a plurality of LEDs connected between said terminals, each LED having an associated controllable shunt switch connected in parallel thereto;
a module controller adapted to control the shunt switches, the module controller having a first input terminal connected to the module input terminal and a second input terminal connected to the module output terminal, the light module being configured to receive at its input terminal and at its output terminal an input current with a data signal modulated thereon, the data containing an address and an action command;
the module controller being configured decode the modulated data, the module controller having a predetermined unique address; wherein the module controller is configured to compare the decoded data address with its own address and, if the compared addresses match, to execute the decoded action command.

2. The light module according to claim 1, further comprising a diode coupled between an input terminal of the module controller and the corresponding module input or output terminal.

3. The light module according to claim 1, wherein the module controller comprises an energy buffer parallel to its input terminals.

4. The light module according to claim 1, wherein each LED is provided with a respective voltage sensor adapted to measure the voltage drop over the LED, and wherein the module controller has sensor inputs coupled to the voltage sensor adapted to receive their measuring signals.

5. The light module according to claim 3, wherein the module controller is configured, in response to a measuring signal indicating that at least one LED of the plurality of LEDs has failed, to generate a control signal for the shunt switch associated with said at least one LED to remain closed.

6. The light module according to claim 1, configured to receive at its input and output terminal an input current from a power source with a current source; wherein the module controller is configured to send a data signal to the power source by briefly switching at least one of said shunt switches from a conductive state to a non-conductive state or from a non-conductive state to a conductive state such as to cause modulation of the output voltage of the current source.

7. A light unit, having an input terminal and an output terminal, the light unit comprising the light module implemented according to claim 1, wherein the module input terminal is connected to the light unit input terminal and wherein the module output terminal is connected to the light unit output terminal.

8. A light unit, having an input terminal and an output terminal, the light unit comprising two or more light modules of claim 1 connected in series, each light module except one having its output terminal connected to the input terminal of the next light module; wherein the module input terminal of the first light module is connected to the unit input terminal and wherein the module output terminal of the last light module is connected to the unit output terminal.

* * * * *